US009077636B2

(12) United States Patent
Armstrong et al.

(10) Patent No.: US 9,077,636 B2
(45) Date of Patent: *Jul. 7, 2015

(54) FLEXIBLE AND SCALABLE DATA LINK LAYER FLOW CONTROL FOR NETWORK FABRICS

(71) Applicant: International Business Machines Corporation, Armonk, NY (US)

(72) Inventors: William J. Armstrong, Rochester, MN (US); Claude Basso, Nice (FR); Chih-jen Chang, Apex, NC (US); Mircea Gusat, Langnau (CH); Jeffrey J. Lynch, Apex, NC (US); Cyriel J. Minkenberg, Gutenswil (CH); Kenneth M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 13/693,111

(22) Filed: Dec. 4, 2012

(65) Prior Publication Data

US 2013/0163419 A1   Jun. 27, 2013

Related U.S. Application Data

(63) Continuation of application No. 13/334,116, filed on Dec. 22, 2011.

(51) Int. Cl.
  *H04L 12/801* (2013.01)
  *H04L 12/46* (2006.01)
  *H04L 12/825* (2013.01)

(52) U.S. Cl.
  CPC ............ *H04L 47/12* (2013.01); *H04L 12/4641* (2013.01); *H04L 47/266* (2013.01)

(58) Field of Classification Search
  CPC .... H04L 12/4641; H04L 47/12; H04L 47/266

USPC .......................................... 709/234; 370/230
See application file for complete search history.

(56) References Cited

U.S. PATENT DOCUMENTS 6,035,105 A * 3/2000 McCloghrie et al. ......... 709/236
6,816,465 B1   11/2004 Barsoum et al.
(Continued)

FOREIGN PATENT DOCUMENTS

JP   2007174152 A   7/2007
JP   2009206971 A   9/2009
(Continued)

OTHER PUBLICATIONS

Draft Standard for Local and Metropolitan Area Networks—Virtual Bridged Local Area Networks—Amendment 6: Provider Backbone Bridges (Draft Amendment to IEEE Std 802.1Q -Rev), IEEE Unapproved Draft Std P802.1ah/D4.0, Nov. 2007 , vol., No., pp. , 2007.*

(Continued)

*Primary Examiner* — Kostas Katsikis
(74) *Attorney, Agent, or Firm* — Patterson & Sheridan, LLP

(57) ABSTRACT

A network fabric may divide a physical connection into a plurality of VLANs as defined by IEEE 802.1Q. Moreover, many network fabrics use Priority Flow Control to identify and segregate network traffic based on different traffic classes or priorities. Current routing protocols define only eight traffic classes. In contrast, a network fabric may contain thousands of unique VLANs. When network congestion occurs, network devices (e.g., switches, bridges, routers, servers, etc.) can negotiate to pause the network traffic associated with one of the different traffic classes. Pausing the data packets associated with a single traffic class may also stop the data packets associated with thousands of VLANs. The embodiments disclosed herein permit a network fabric to individually pause VLANs rather than entire traffic classes.

9 Claims, 8 Drawing Sheets

(56) References Cited

U.S. PATENT DOCUMENTS

| | | | |
|---|---|---|---|
| 7,508,763 B2 | 3/2009 | Lee | |
| 7,639,608 B1 | 12/2009 | Jain et al. | |
| 7,761,589 B1 | 7/2010 | Jain | |
| 7,774,461 B2 | 8/2010 | Tanaka et al. | |
| 7,953,002 B2 | 5/2011 | Opsasnick | |
| 7,990,857 B2 | 8/2011 | Jain et al. | |
| 8,514,713 B2 | 8/2013 | Jain | |
| 8,599,694 B2 * | 12/2013 | Tatapudi et al. | 370/235 |
| 2002/0087711 A1 | 7/2002 | Leung | |
| 2003/0016628 A1 | 1/2003 | Kadambi et al. | |
| 2005/0094634 A1 * | 5/2005 | Santhanakrishnan et al. | 370/389 |
| 2005/0204366 A1 * | 9/2005 | Billau et al. | 719/324 |
| 2006/0088036 A1 * | 4/2006 | De Prezzo | 370/395.53 |
| 2007/0171914 A1 | 7/2007 | Kadambi et al. | |
| 2007/0268823 A1 * | 11/2007 | Madison et al. | 370/229 |
| 2009/0268612 A1 * | 10/2009 | Felderman et al. | 370/230 |
| 2009/0304007 A1 | 12/2009 | Tanaka et al. | |
| 2010/0046556 A1 | 2/2010 | Jain et al. | |
| 2010/0061239 A1 | 3/2010 | Godbole et al. | |
| 2010/0135289 A1 | 6/2010 | Bowes | |
| 2010/0177637 A1 | 7/2010 | Kadambi et al. | |
| 2010/0189119 A1 * | 7/2010 | Sawada | 370/401 |
| 2010/0232316 A1 * | 9/2010 | Takacs | 370/254 |
| 2010/0238804 A1 | 9/2010 | Jain | |
| 2011/0078181 A1 * | 3/2011 | Mitsumori | 707/769 |
| 2012/0250511 A1 * | 10/2012 | Neeser | 370/235 |
| 2013/0016609 A1 * | 1/2013 | Hayakawa et al. | 370/230 |
| 2013/0301409 A1 * | 11/2013 | Jain | 370/230 |

FOREIGN PATENT DOCUMENTS

| | | | | |
|---|---|---|---|---|
| KR | 20090062585 A | * | 6/2009 | H04L 12/28 |
| WO | WO 2009116026 A1 | * | 9/2009 | |

OTHER PUBLICATIONS

Pepelnjak, "Passive Optical Networks," Feb. 3, 2010, from http://blog.ipspace.net/2010/02/passive-optical-networks.html.*

U.S. Appl. No. 13/334,116, entitled Flexible and Scalable Data Link Layer Flow Control for Network Fabrics, filed Dec. 22, 2011.

International Search Report and Written Opinion of the ISA dated May 23, 2013—International Application No. PCT/IB2012/057281.

Pepelnjak, "Introduction to 802.1 QBB (Priority-Based Flow Control—PFC)", Sep. 7, 2010, from http://blog.ipspace.net/2010/09/introduction-to-8021qbb-priority-flow.html.

* cited by examiner

US 9,077,636 B2

FLEXIBLE AND SCALABLE DATA LINK LAYER FLOW CONTROL FOR NETWORK FABRICS

CROSS-REFERENCE TO RELATED APPLICATIONS

This application is a continuation of co-pending U.S. patent application Ser. No. 13/334,116, filed Dec. 22, 2011. The aforementioned related patent application is herein incorporated by reference in its entirety.

BACKGROUND

1. Field of the Invention

The present invention generally relates to relieving congestion in a network fabric, or, more specifically, to pausing specific data flows within the network fabric.

2. Description of Related Art

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

A plurality of switches may be combined to create one logical switch. However, the communication interface between the logical switch and the servers may become so busy that packets are dropped (or lost). That is, a server may transmit packets to a switch faster than the switch can process the received packets. If the buffer associated with the switch fills up, subsequent packets may be dropped. To avoid packet loss, a switch may instruct the server to temporarily stop sending packets to the switch. The switch may use this period of time to relieve network congestion.

SUMMARY

Embodiments of the invention provide a method, computer-readable storage medium, and a network device for pausing network traffic. Upon determining to suspend traffic flow through a virtual local area network, the method, storage medium, and network device generate a data frame comprising a virtual local area network ID associated with the virtual local area network. The data frame is configured to instruct a computing device to stop transmitting data packets assigned to the virtual local area network. The method, storage medium, and network device transmit the data frame to the computing device.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
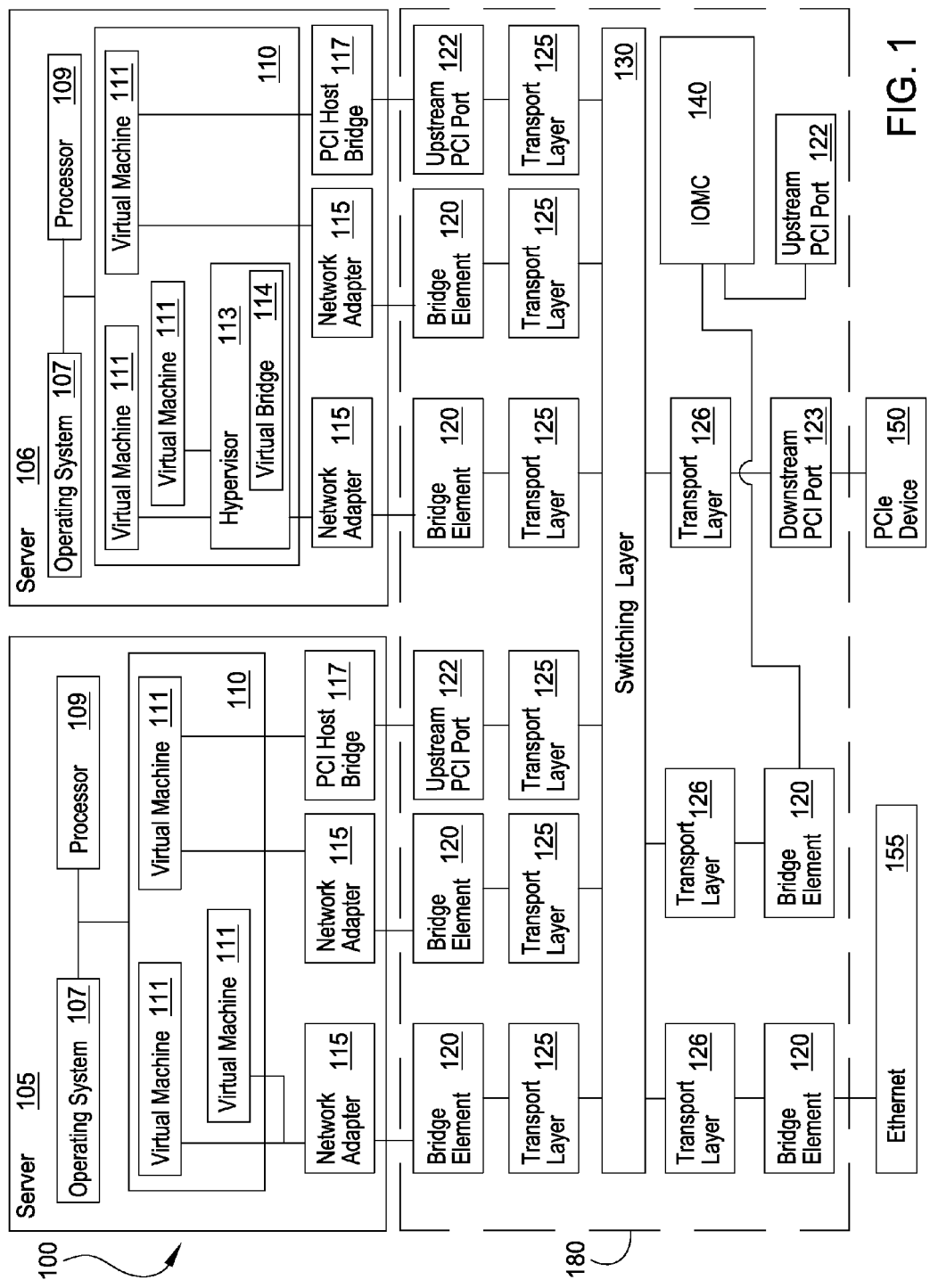
FIG. 1 illustrates a system architecture that includes a distributed, virtual switch, according to one embodiment of the invention.

IEEE 802.3x introduced the ability to pause data flowing between two network devices (e.g., a server and switch) in an Ethernet network (e.g., Data Center Bridging). However, this standard did not provide a technique for distinguishing between the packets transmitted between the two network devices—i.e., all network traffic between the network devices is stopped. Later, IEEE 802.1Q (or 802.1p) was adopted which divides network traffic in one physical connection into eight different priorities or traffic classes. Taking advantage of this greater granularity, IEEE 802.1Qbb (hereinafter referred to as Priority Flow Control (PFC)) was developed which permits a switch to selectively pause (i.e., temporarily stop) only the data packets assigned to one of the traffic classes yet allow the two network devices to continue to transmit packets associated with the other seven traffic classes.

IEEE 802.1Q standardized the use of virtual local area networks (VLAN) in Ethernet networks. In general, VLANs permit the end stations of a physical LAN to be grouped together even if the end stations of the LAN are not located on the same network switch. That is, two physical connections associated with two different switches may be logical connected to be part of the same LAN (i.e., a VLAN). Packets include a VLAN ID (i.e., VLAN tag) which assigns the packets to a particular VLAN. VLANs provide the segmentation services traditionally provided by routers and increase the scalability, security, and network management of a LAN.

IEEE 802.1Q provides 12 bits for identifying a service VLAN (S-VLAN)—i.e., 4096 uniquely addressable S-VLANs. Later routing standards added that each S-VLAN may have a plurality of associated customer VLANs (C-VLANs). In IEEE 802.1QinQ, for example, each S-VLAN can be associated with up to 4096 C-VLANs. A LAN following this standard may have up to 16,777,216 VLANs (2^12*2^12). However, PFC provides only eight different traffic classes that may be used to identify network traffic to pause. Instead of relying only on these eight traffic classes to manage network traffic, the embodiments disclosed herein disclose using a data packet that permits a network device to stop traffic associated with an individual VLAN. A VLAN creates a set of closed user groups where only the members of the same VLAN can communicate over the same LAN (i.e., physical Ethernet). Within any VLAN, the data may be divided up into eight traffic classes according to priorities.

Once a computing device receives this enhanced data packet, the device no longer transmits any packets that match the VLAN ID. Thus, the enhanced packet may increase the granular control of the LAN and its performance.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

FIG. 1 illustrates a system architecture that includes a distributed switch, according to one embodiment of the invention. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters). A converged network adapter may include single root I/O virtualization (SR-IOV) adapters such as a Peripheral Component Interconnect Express (PCIe) adapter that supports, for example, Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the virtual switch 180. The data is then routed via the switching layer 130 to the correct downstream PCI port 123 which may be located on the same or different switch module as the upstream PCI port 122. The data may then be forwarded to the PCI device 150. As used herein, "virtual switch" is used to describe the plurality of distributed hardware switch elements that are interconnected to appear to a device connecting to one of the switch element to be one single switch.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed virtual switch 180.

The distributed virtual switch 180, in general, includes a plurality of bridge elements 120 that may be located on a plurality of a separate, though interconnected, hardware components. To the perspective of the network adapters 115, the virtual switch 180 acts like one single switch even though the switch 180 may be composed of multiple switches that are physically located on different components. Distributing the switch 180 provides redundancy in case of failure and scales to interconnect more servers in a more cost-effective manner relative to a single large switch.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

Figure 2:
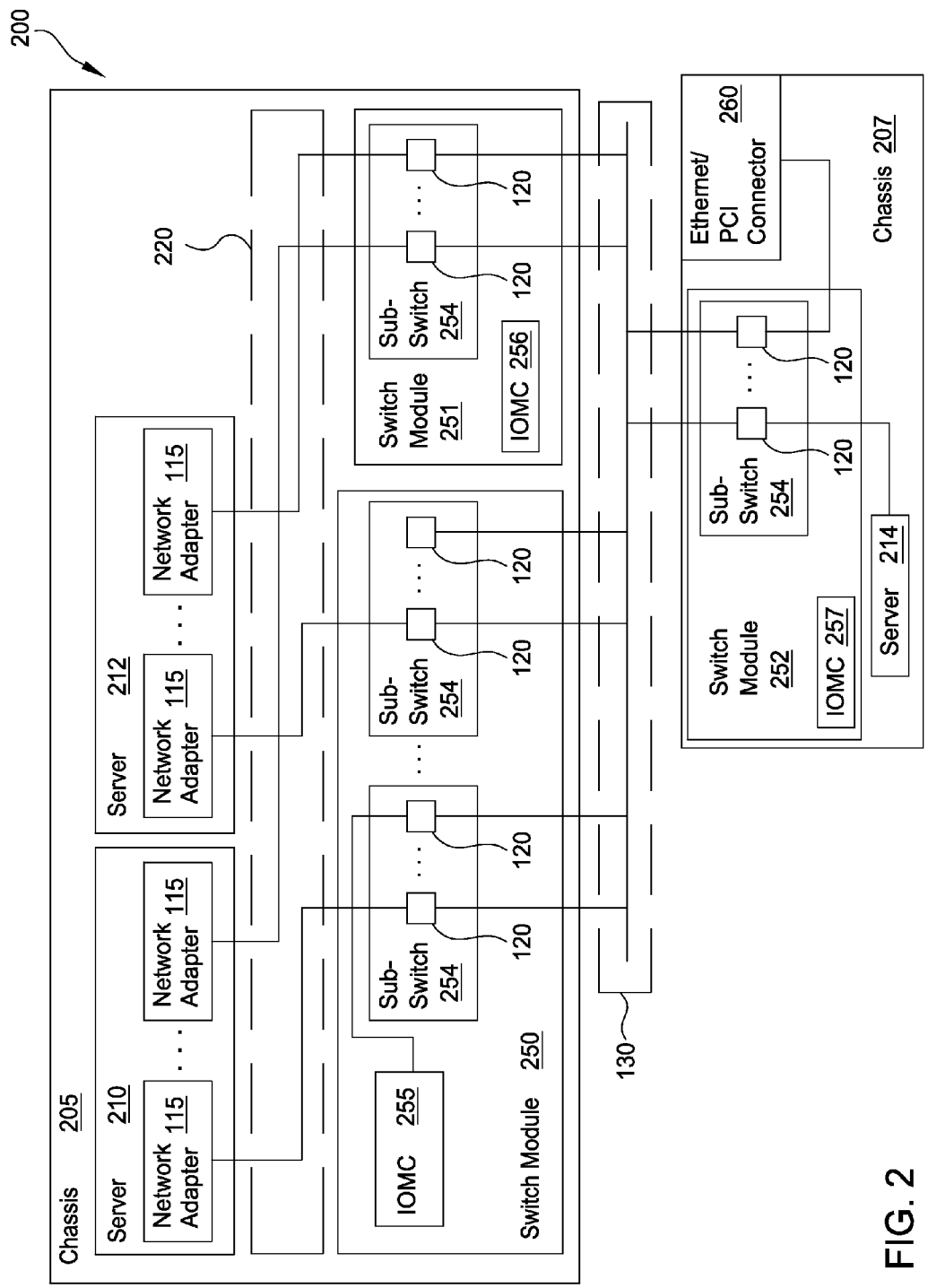
FIG. 2 illustrates the hardware representation of a system that implements a virtual switch, according to one embodiment of the invention.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
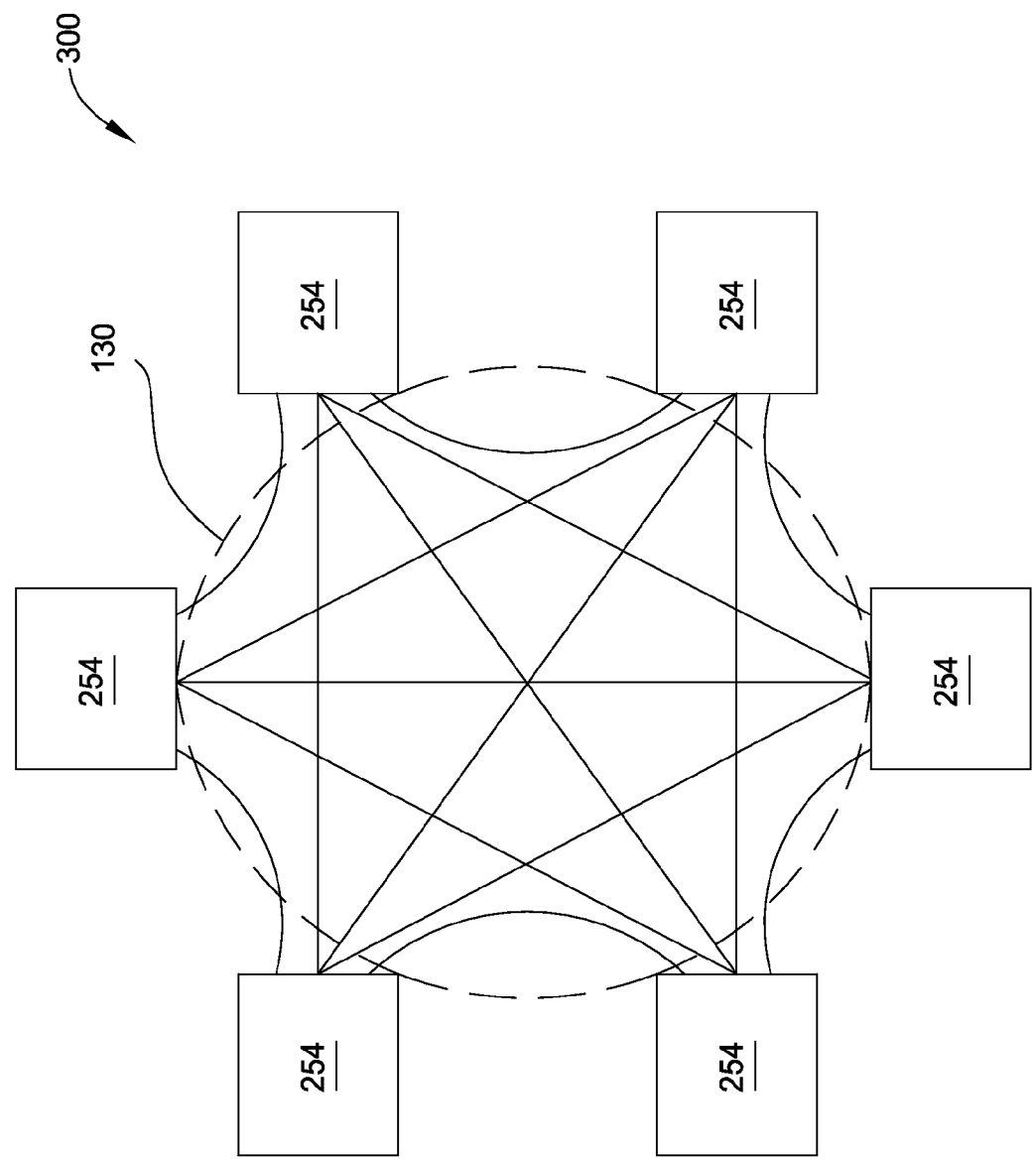
FIG. 3 illustrates a virtual switch, according to one embodiment of the invention.

FIG. 3 illustrates a virtual switching layer, according to one embodiment of the invention. Each sub-switch 254 in the systems 100 and 200 are connected to each other using the switching layer 130 and the bridge elements 120 via a mesh connection schema. That is, no matter the sub-switch 254 used, a cell (i.e., data packet) can be routed to another other sub-switch 254 located on any other switch module 250, 251, 252. This may be accomplished by directly connecting each sub-switch 254—i.e., each sub-switch 254 has a dedicated data path to every other sub-switch 254. Alternatively, the switching layer 130 may use a spine-leaf architecture where each sub-switch 254 (i.e., a leaf node) is attached to at least one spine node. The spine nodes route cells received from the sub-switches 254 to the correct destination sub-switch 254. However, this invention is not limited to any particular technique for interconnecting the sub-switch 254.

A Network Fabric Implementing VLAN Channels

Figure 4:
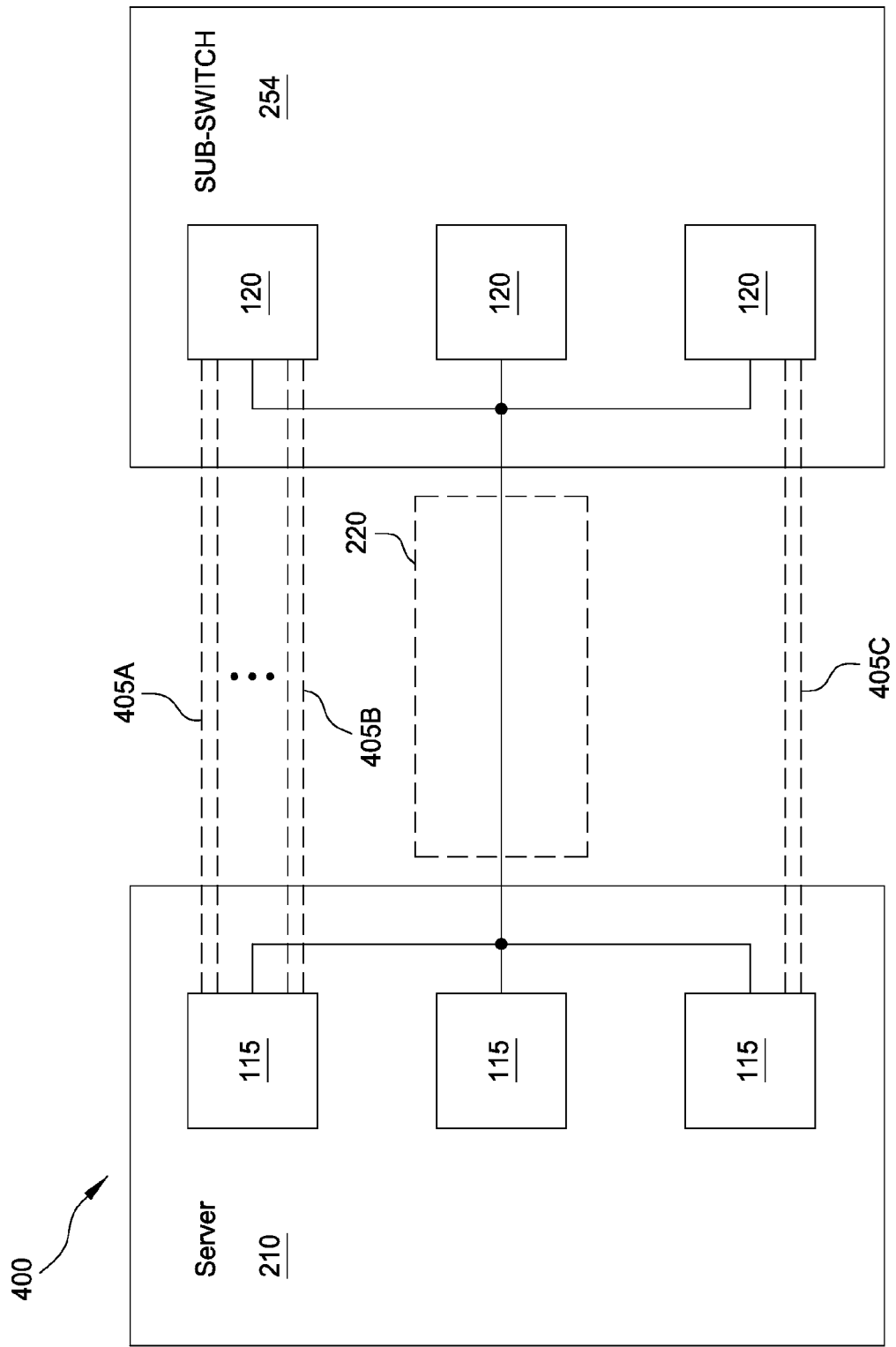
FIG. 4 illustrates using virtual local access networks in the system of FIG. 1, according to embodiments of the invention.

FIG. 4 illustrates using virtual local access networks in the system of FIG. 2, according to embodiments of the invention. Specifically, FIG. 4 simplifies FIG. 2 to include a server 210 and sub-switch 254. The network adapters 115 connect, via the midplane 220, to the bridge elements 120. However, the midplane 220 is simplified to show only one physical connection that makes up the LAN between the network adapters 115 and the bridge elements 120. In one embodiment, each network adapter 115 would have a one or more connections to a respective bridge element 120.

The dashed lines define different service channels (S-channels) 405A-C between a network adapter 115 and a particular bridge element 120. More generally, the dashed lines may represent any type of VLAN Channel (i.e., a point-to-point communication between two computing device that makes up a portion of the data path in a VLAN). Although a network adapter 115 may have only one or two physical Ethernet connections to a bridge element 120 (e.g., one 100 G/bit connection or two 40 G/bit connections), these connections may be logically divided into VLANs which are assigned an individual S-channel for point-to-point communications. That is, the physical connections that make up the interface between the network adapters 115 and bridge elements 120 in the midplane 220 may be divided into thousands if not millions of different VLANs and their respective S-channels. Assigning packets to VLANs allows more granular control of the LAN. For example, an administrator may assign different security protocols to different VLANs or manage the packets of each VLAN differently.

In FIG. 4, each network adapter 115 may establish one or more S-Channels to a bridge element 120 so long as the adapter 115 is physically connected to the bridge element 120 via the midplane 220. Thus, the topmost network adapter 115 may have S-channels to other bridge elements 120 besides the one shown. The system 400 may assign as many S-Channels as there are uniquely addressable VLANs. For IEEE 802.1Q, this is 4096 S-VLANs. The S-Channels may be distributed in any manner among the different physical connections of the midplane 220.

Figure 5:
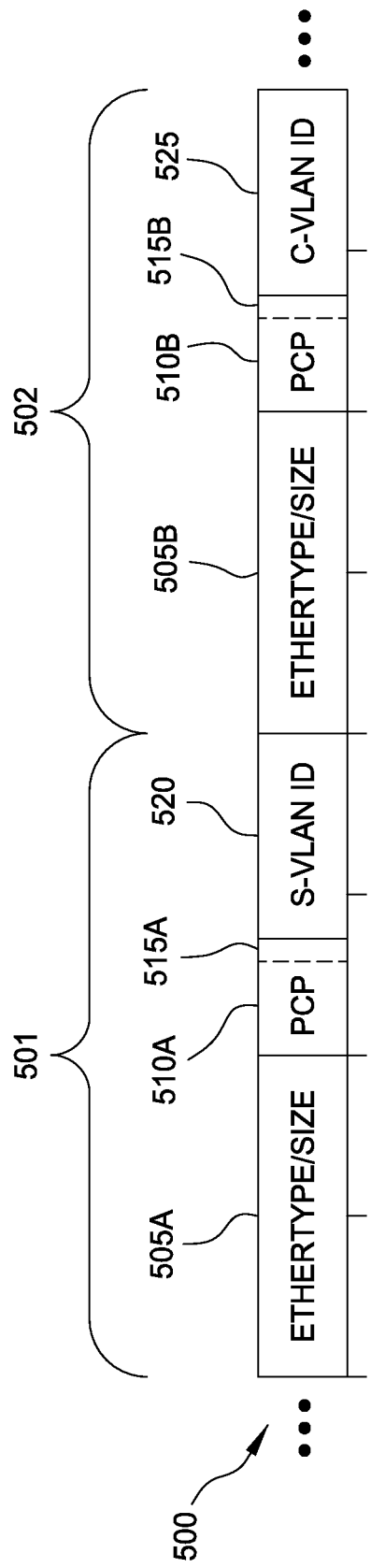
FIG. 5 is a data frame for identifying network traffic based on a virtual local area network ID, according to one embodiment of the invention.

FIG. 5 is a data frame for identifying network traffic based on VLAN ID, according to one embodiment of the invention. Specifically, data frame 500 illustrates a portion of a data frame that is compatible with IEEE 802.1QinQ. The data frame 500 is divided into two different portions: an outer tag (S-tag) 501 and an inner tag (C-tag) 502. The outer tag 501 is the same as the tag defined in IEEE 802.1Q that first introduced VLANs in Ethernet networks. However, to provide an administrator with greater control of the LAN, IEEE 802.1QinQ introduced the concept of double tagging by adding the inner tag 502. Thus, the embodiments disclosed herein may be used to address VLANs that are established based on IEEE 802.1Q or 802.1QinQ.

The tags 501, 502 include the EtherType/size 505, a priority code point (PCP) 510, a canonical format indicator (CFI) 515, and an S-VLAN ID 520 or a C-VLAN ID 525. The EtherType 505 is typically a 16-bit (or two byte) field used to indicate which protocol is encapsulated in the payload of the data packet. The PCP 510 is a three-bit field that refers to the priority or traffic class (i.e., priority 0-priority 7) assigned to the S-VLAN or C-VLAN, respectively. The CFI 515 is a 1-bit field that indicates whether a MAC address (stored elsewhere in the data frame 500) is in a non-canonical format.

For IEEE 802.1Q and 802.1QinQ, the S-VLAN ID 520 is 12 bits and specifies the S-VLAN to which the frame 500 belongs. The C-VLAN ID, which is not defined in IEEE 802.1Q standard, is also 12 bits long and specifies the C-VLAN to which the frame 500 belongs. That is, IEEE 802.1QinQ expanded IEEE 802.1Q such that each S-VLAN can have up to 4096 uniquely addressable C-VLANs, thereby providing over 16 million addressable VLANs. A data frame defined only by IEEE 802.1Q, however, would include portions 505A, 510A, 515A, and 520 but would not include portions 505B, 510B, 515B, and 525. In either case, the embodiments disclosed herein are not limited to IEEE 802.1Q and 802.1QinQ but may be used in any related or derivation of these standards (e.g., IEEE 802.1Qat or IEEE 802.1ak) or any other standards that are presently or may at a future time be compatible with generating VLANs.

In general, the data frame 500 is a portion of a larger data frame (i.e., a data packet) that is transmitted from a source to a destination across a network. The entire data frame would include other partitions that include, for example, a preamble, source and destination addresses, a payload, error correction code, and the like. A more detailed example of a complete data frame or packet is discussed in regards to FIG. 8.

Figure 6:
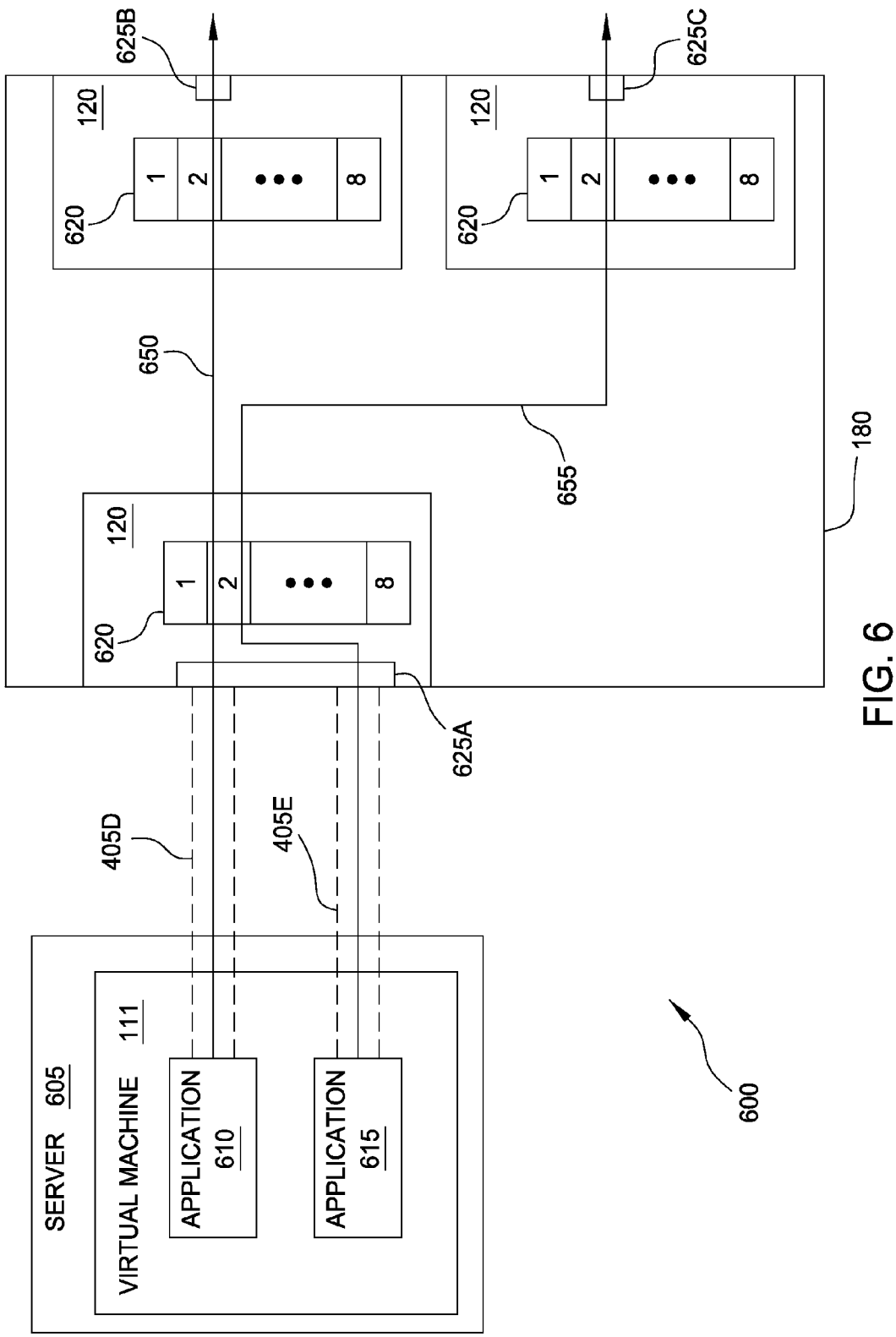
FIG. 6 illustrates using virtual local access networks in the system of FIG. 1, according to one embodiment of the invention.

FIG. 6 illustrates using VLANs in the system of FIG. 1, according to one embodiment of the invention. As shown, FIG. 6 includes a server 605 with a virtual machine 111 that may have two different applications 610, 615 executing. The applications 610, 615 are each associated with a separate S-Channel 405 and VLAN, or more specifically, an S-VLAN that routes data packets from the applications 610, 615 to at least one bridge element 120 in the virtual switch 180. For clarity, the physical connection between the server 605 and the bridge element 120 is omitted. Furthermore, the S-Channels 405D and E may be associated with the same connection or different physical connections.

The virtual switch 180 includes a plurality of bridge elements 120 that each include a port 625 and buffer 620. Although the S-Channels 405D and E are both associated with the same port 625A, in one embodiment, they may be associated with different ports. As the bridge elements 120 receive data packets, they may buffer the packets into a plurality of virtual or logical memory portions within the buffer 620. In the embodiment shown here, the buffers 620 are logically divided into eight portions although any number of partitions may be used. Each portion corresponds to the eight different traffic classes or priorities defined by IEEE 802.1Qbb PFC. That is, when a bridge element 120 receives a packet, it may read the value stored in the PCP 510 of each data packet. As stated earlier, the three-bit PCP 510 value defines the priority or traffic class to which the frame is associated with (priority 0-7). For example, if the PCP 510 value is 0, the received frame is stored in portion 1 of the buffer 620; if the value is 1, the received frame is stored in portion 2, and so on.

Using a queue in each of the portions, the bridge elements 120 may use the mesh network in the virtual switch 180 to forward the packets. For example, application 610 may transmit a data packet in S-Channel 405D that the receiving bridge element 120 then forwards along path 650 in the mesh network to the buffer 620 of a different bridge element 120. From there the packet is forwarded via port 625B to, for example, a WAN. Similarly, application 615 may transmit a packet using S-Channel 405E to portion 2 of bridge element 120. In one embodiment, if the packet transmitted from application 615 arrives later than the packet transmitted from application 610, then the packet from application 615 must wait in the portion 2 queue until the packet from application 615 is forwarded. Then the packet for application 615 may be forwarded along path 655 to portion 2 of a second buffer 620. From that buffer 620, the packet may be forwarded via port 625C to, for example, another server connected to the virtual switch 180.

Head-of-line blocking (HOL blocking) is a performance-limiting phenomenon that occurs in buffered network devices—e.g., bridge elements 120. Here, the bridge elements 120 may be interconnected in virtual switch 180 by a mesh network as shown in FIG. 3. In some embodiments, the buffers 120 may be configured as first-in first-out (FIFO) buffers such that each portion 1-8 has a separate queue. As data packets queue up in the different portions of the buffers 120, only the packet at the head of the line may be sent. For example, if a packet at the head of the line for portion 2 cannot be transmitted because its destination is currently busy (e.g., the destination is receiving a packet from a different bridge element 120) then all the other packets in the queue of portion 2 are similar blocked from being transmitted. Even if the destination of a packet deeper in the queue is available, that packet cannot be transmitted until the packet at the head of the line is transmitted.

The bridge element 120 may monitor each portion of the buffer 620 individually. If HOL blocking (or any other network congestion) causes a queue in one of the portions to reach a threshold, the bridge element 120 may instruct the server 605 to stop, at least temporarily, from sending packets to the bridge element 120. Specifically, PFC provides a protocol where the bridge element 120 transmits a packet to the server 605 that instructs the server 605 to stop transmitting packets associated with a specific traffic class. Thus, PFC improves on prior standards that stopped all traffic flowing between the bridge element 120 and the server 605. Instead, the server 605 receives a PAUSE PFC packet and stops sending only the data packets associated with the specified traffic class. The server 605 may continue to transmit data packets associated with the other seven traffic classes.

When transmitting a PAUSE PFC packet, the bridge element 120 may specify a certain time period to suspend the traffic class or instruct the server 605 to wait until it receives another packet from the bridge element 120 instructing the server 605 to resume. This delay permits the bridge element 120 to reduce a queue in one of the portions of the buffer 620 without having to drop packets (i.e., the PFC protocol enables lossless operation). Once the queue is reduced to some threshold, the network traffic for that traffic class may resume by the bridge element 120 transmitting a second pause packet. Alternatively, the server 605 may begin again to transmit packets for the paused traffic class after a time period, which may be set in the PAUSE PFC packet, expires.

FIG. 6 illustrates that separating the network traffic between two network devices (e.g., the server 605 and bridge element 120) into eight traffic classes may not provide the granularity desired by an administrator. As shown, both applications 610 and 615 transmit data packets to bridge element 120 that are assigned to the same traffic class—i.e., priority 1—and are stored in portion 2 of the buffers 620. However, each application 610, 615 is associated with a different S-Channel 405D-E within the traffic class. Although the two applications 610, 615 may be in the same traffic class, they may transmit data packets at vastly different rates. If, for example, application 610 is transferring data packets at a much higher rate than application 615, the bridge element 120 may be unable to forward the data packets because of network congestion (HOL blocking and the like). Using PFC, the bridge element 120 may instruct server 605 to stop transmitting priority 1 packets. However, this stops both application 610 and application 615 from sending packets. Instead, because of the large disparity between the transfer rates, bridge element 120 may be able to continue to receive and forward packets from application 615 and still reduce the size of the portion 2 queue. However, PFC does not provide the granularity to distinguish between packets received from the same traffic class. Thus, because of network congestion that may be attributable to only one VLAN (e.g., an S-VLAN, or C-VLAN), the data traffic for a plurality of VLANs in the same traffic class may be unnecessarily stopped.

Further, even if the data packets rates for both applications 610, 615 are the same—i.e., both applications 610, 615 contribute to the network congestion—one application may be more important than the other. In this case, an administrator may prefer to stop only the network traffic associated with the less important application. Thus, packet loss may be prevented but some throughput is still maintained.

Figure 7:
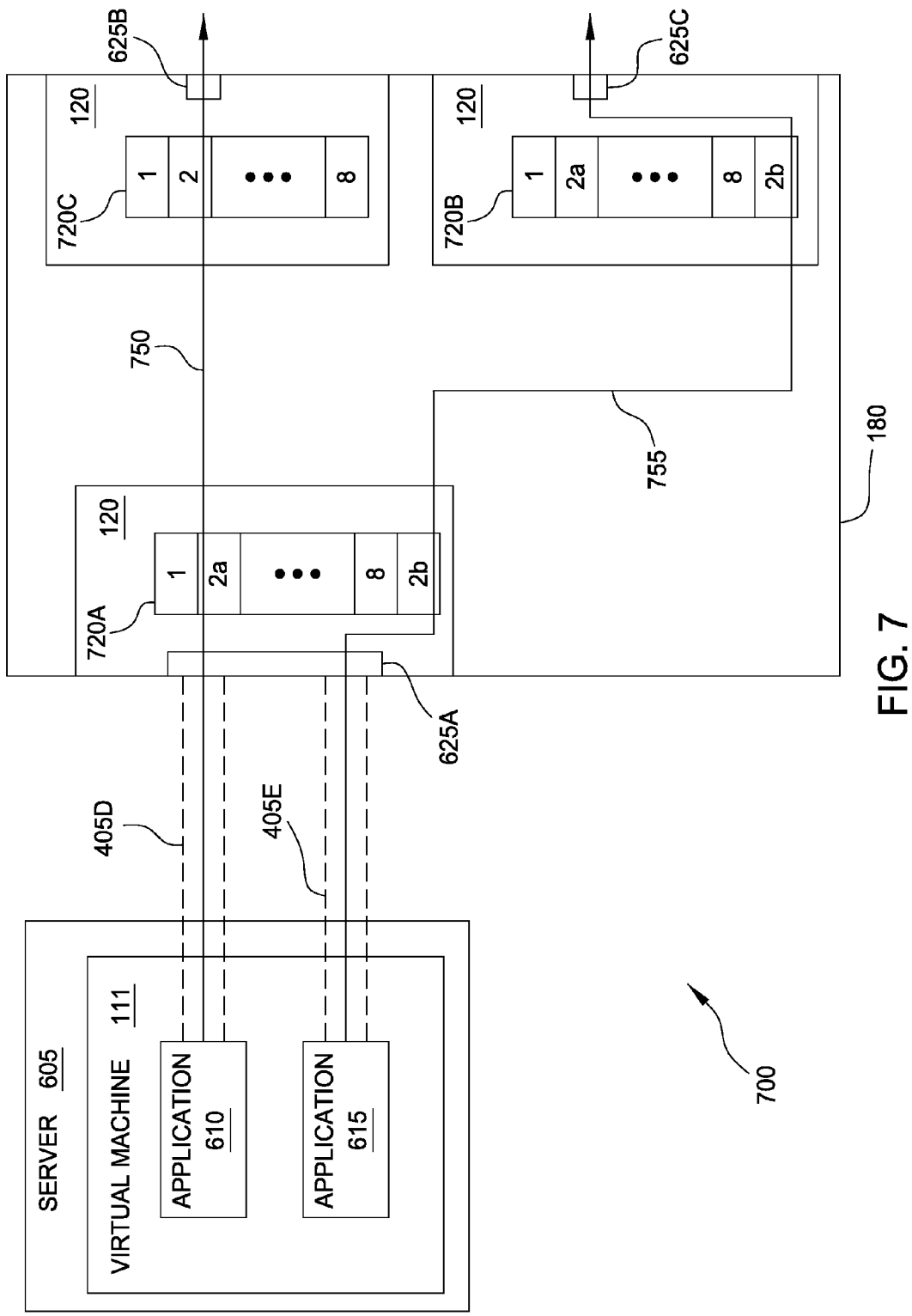
FIG. 7 illustrates using virtual local access networks in the system of FIG. 1, according to one embodiment of the invention.

FIG. 7 illustrates using VLANs in the system of FIG. 1, according to one embodiment of the invention. As shown, the system 700 is configured to pause network traffic based on a VLAN ID instead of, or in addition to, using PFC to pause a particular traffic class. Instead of logically partitioning the buffers 720 into eight partitions, the buffers 720 may be partitioned into nine or more partitions. As shown, buffers 720A and 720B have nine portions while buffer 720C only has eight. Although eight and nine logical portions are used as examples, the buffers may be partitioned into any number of portions.

In this embodiment, the bridge elements 120 are configured to detect network congestion associated with a particular VLAN or S-Channel. Here, both application 615 and application 610 are associated with a different VLAN and VLAN ID. Moreover, the buffer 720A may include a logical partition for every unique VLAN. Each VLAN can support the eight traffic classes defined by PFC—i.e., a data frame associated with a specific VLAN can belong to one of the eight traffic classes. Thus, the partitions of the buffer for each traffic class may be subdivided based on the VLAN that transmit data in those traffic classes. For example, one VLAN may have up to eight logical partitions in a buffer 720, one in each of the traffic class buffers. Alternatively, the buffers 720 may be logically divided by VLANs and then further divided by the traffic classes within the VLAN.

If the bridge element 120 determines to stop VLAN traffic associated with application 610 and S-Channel 405D, this does not affect the VLAN traffic associated with application 615. As shown, the priority 1 traffic of S-Channel 405D is assigned to portion 2a of buffer 720A while priority 1 traffic of S-Channel 405E is assigned to portion 2b of buffer 720A. Stopping S-Channel 405D does not affect the traffic flowing though S-Channel 405E. As congestion clears, the packets stored in portion 2a before the VLAN was blocked begin to be forwarded. Using separate buffer pools based on the VLAN ID helps to prevent HOL blocking.

Moreover, other bridging elements 120 in the virtual switch 180 may also separate the buffer based on the number of connected VLANs—e.g., buffer 720B. Alternatively, the buffer 720C may not need to separate the traffic class based on VLAN IDs since it does not receive data packets from application 615. Thus, buffer 720C may continue to have only eight partitions since it only receives priority traffic from application 610.

In one embodiment, the buffers 720 may not need additional partitions. For example, the bridge element 120 may continue to receive data packets associated with application 615 and place these packets in the same queue that includes the remaining packets from application 610. Accordingly, portion 2 (as shown in FIG. 6) continues to forward the packets associated with both applications 610, 615 but receives new packets only from application 615.

Data Packets for Pausing VLANs

Figure 8:
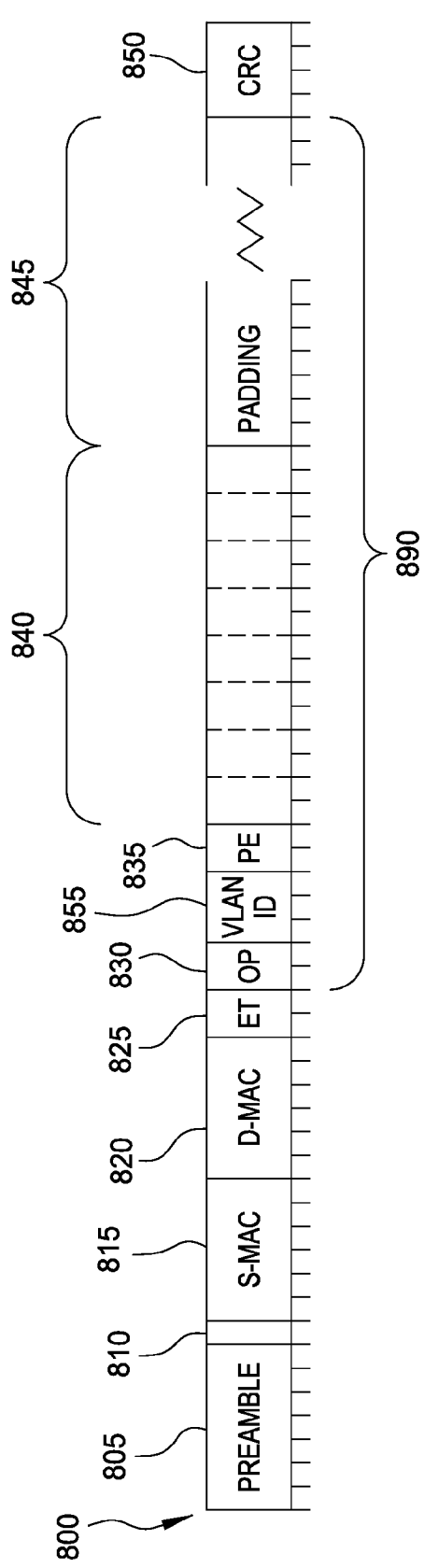
FIG. 8 is a data frame for pausing network traffic based on a virtual local area network ID, according to one embodiment of the invention.

FIG. 8 is a data frame for pausing network traffic based on a VLAN ID, according to one embodiment of the invention. Specifically, the data frame or packet 800 is an example of a data frame that a network device may transmit to another network device to stop the traffic associated with a specific VLAN. For example, network device 120 may transmit data frame 800 to instruct server 605 to stop transmitting data associated with application 610. The data frame 800 may be used in any network system (e.g., an Ethernet network) that uses VLANs. The VLANs may be configured using IEEE 802.1Q or its derivatives—i.e., 802.1Qxx where "x" represents any alphabetical letter.

The data frame 800 includes a preamble 805, start-of-frame delimiter 810, source MAC address 815, destination MAC address 820, Ethertype/size (ET) 825, opcode (OP) 830, VLAN ID 855, priority enable (PE) 835, pause duration 840, padding 845, and cyclic redundancy check (CRC) 850. Portions 805, 810, 815, 820, 825, 830, 835 and 850 may perform a similar function as defined by known routing protocols and will not be discussed in detail here.

Once the bridge element 120 identifies a VLAN (or VLANs) to pause in order to lessen network congestion, the bridge element 120 may determine the VLAN ID 855 associated with the VLAN, such as an S-VLAN ID or a C-VLAN ID. Moreover, in one embodiment, other information may be stored in the VLAN ID 855 such as priority enable bits for each of the VLAN IDs. Using one or more of these IDs, the bridge element 120 generates a data frame 800 with the VLAN ID 855 with the value of the identified VLAN. For example, if the network system configures VLANs based on IEEE 802.1QinQ as shown in FIG. 5, the bridge element may use the first 12 bits of the three-byte VLAN ID 855 to put in the particular S-VLAN ID and use the other 12 bits of the VLAN ID 855 to put in the C-VLAN ID. Thus, the administrator may stop a specific C-VLAN in a specific S-VLAN. However, the VLAN ID 855 is not limited to only the VLAN addressing schemes defined by IEEE 802.1Q or QinQ but may be used in other current or future routing protocols.

Moreover, the PE 835 may be used to stop a subset of the traffic classes within a VLAN. That is, only the priority 2 of the VLAN's traffic is backing up in the buffer, the bridge element 120 may use both the VLAN ID 855 in combination with the PE 835 to pause one or more of the traffic classes within the VLAN.

The bridge element 120 may use pause duration 840 to store a length of time for pausing the network traffic that has the same ID as the VLAN ID 855. Alternatively, the pause duration 840 may instruct the receiving network device to wait until a new data frame 800 is received that instructs the network traffic to resume.

In general, each tick mark at the bottom of data frame 800 represents one byte (i.e., 8 bits) of data. As shown, the VLAN ID 855 includes 3 bytes of data. However, the VLAN ID 855 may consist of any different number of bits depending on the portion of the VLANs that are to be addressable. For example, 3 bytes provides addressability for 16,777,216 VLANs (2^24) which is the number of different combinations of VLANs (i.e., S-VLANs plus C-VLANs) in IEEE 802.1QinQ. If the VLAN ID 855 is only 12 bits, it can uniquely address 4096 VLANs (2^12) which is the number of VLANs supported by IEEE 802.1Q.

Depending on the routing protocol used, the padding 845 may comprise of different bytes. Because the padding 845 typically does may not contain useful data when a PAUSE data frame is transmitted in PFC, its extra partitioned space may be used to extend the VLAN ID 855 to increase addressability. For example, if the data frame 800 is 64 bytes in total (i.e., the same as the length of a PAUSE frame in PFC) then the VLAN ID 855 is three bytes and the padding 845 would be 23 bytes. If the VLAN ID 855 is two bytes, then the padding 845 would be 24 bytes. However, the total length of data frame 800 is not limited to 64 bytes but may be extended to a much greater length—e.g., thousands of bytes.

In one embodiment, the VLAN ID 855 may serve as a major index while the PE 835 serves as a minor index. If, for example, the VLAN ID 855 is two bytes and the PE 835 is three bits, then the two indexes can address approximately 512 thousand unique channels (2^16*2^3). Additionally, PE 835 and VLAN ID 855 may be used as indexes even if the VLAN ID 855 is a combination of an S-VLAN ID and a C-VLAN ID.

Figure 9:
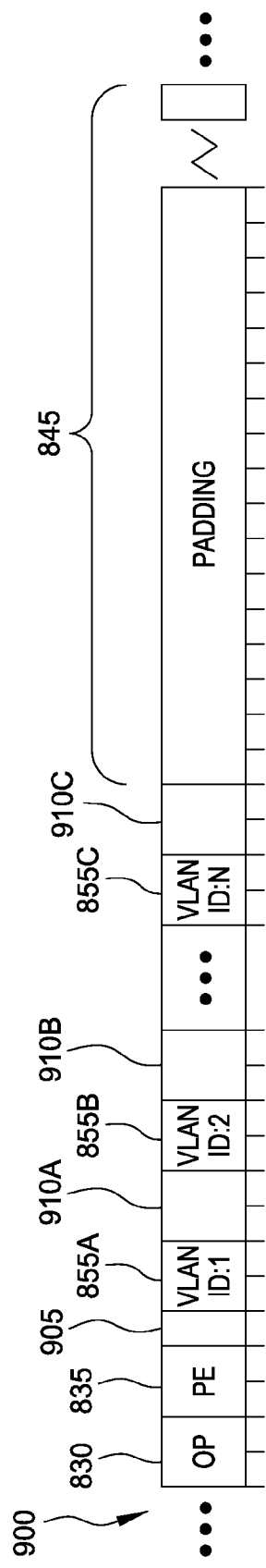
FIG. 9 is a data frame for pausing network traffic based on a virtual local area network ID, according to one embodiment of the invention.

FIG. 9 is a data frame for pausing network traffic based on a VLAN ID, according to one embodiment of the invention. Specifically, FIG. 9 is a second embodiment for pausing a particular VLAN in a network. In contrast to the data frame 800 illustrated in FIG. 8, data frame portion 900 permits a network device to pause multiple VLANs using a single data frame or packet.

Data frame 900 corresponds to portion 890 of data frame 800. That is, the rest of the data frame not shown in FIG. 9 may resemble the other portions shown in FIG. 8. Data frame 900 differs from portion 890 by adding a plurality of VLAN IDs 855A-C, a plurality of pause durations 910A-C, and a VLAN count 905. In this embodiment, the bridge element 120 may determine the number of VLANs that it wishes to pause. Once this determination is made, the bridge element 120 stores the binary representation of the total number of VLANs it wishes to pause in VLAN count 905. In one embodiment, the location of the VLAN count 905 is standardized so that the receiving network device will always know where the count may be found. The bridge element 120 stores the VLAN IDs associated with the count in VLAN IDs 855A-C and, if desired, a pause duration 910A-C that corresponds to each of the VLAN IDs 855A-C. Although as shown in a particular order, the VLAN IDs 855A-C and pause durations 910A-C may be grouped separately or have padding between each value.

The network device that receives the data frame 900 may then read the VLAN count 905 and determine how many VLAN IDs 855A-C are stored in the data frame 900. For example, if the VLAN count 905 has the value of 10, then there will be 10 valid VLAN IDs 855 (i.e., VLAN ID:1-VLAN ID:10) that follow the VLAN count 905 in the data frame. The VLAN count 905, VLAN IDs 855A-C, pause durations 910A-C may be any number of bits. In one embodiment, the lengths of the VLAN count 905, VLAN-IDs 855A-C, and pause durations 910A-C in the same data frame 900 are consistent so that the receiving network device can determine when a one value ends and another begins.

Assuming that a total length of the data frame that includes data frame portion 900 is 64 bytes, VLAN count 905 is one byte, VLAN ID 855 is two bytes, and a pause duration 910 is two bytes, then each pause frame can identify up to 10 VLANs with their respective pause durations. This length corresponds to the current length of the PAUSE frames for the PFC standard defined in IEEE 802.1Qbb. However, if this length threshold is ignored and if the total length of the pause frame is increased to 1513 bytes, then up to 373 VLANs may be paused by transmitting one pause frame.

As recognized by one of ordinary skill in the art, current network devices may be updated with software or firmware updates that would permit the devices to both transmit, receive, and interpret pause frames such as those illustrated by frames 800 and frame portion 900. Thus, any network currently using VLANs as defined by IEEE 802.1Q and PFC may be configured to generate and read the data frames illustrated in FIGS. 8-9.

CONCLUSION

A network fabric may divide a physical connection into a plurality of VLANs as defined by IEEE 802.1Q. Moreover, many network fabrics use PFC to identify and segregate network traffic based on different traffic classes or priorities. Current routing protocols define only eight traffic classes. In contrast, a network fabric may contain thousands of unique VLANs. When network congestion occurs, network devices (e.g., switches, bridges, routers, servers, etc.) can negotiate to pause the network traffic associated with one of the different traffic classes. Pausing the data packets associated with a single traffic class may also stop the data packets associated with thousands of VLANs. The embodiments disclosed herein permit a network fabric to individually pause VLANs rather than entire traffic classes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for pausing network traffic, comprising:
    dividing a buffer into a plurality of logical memory portions, wherein each of the plurality of logical memory portions corresponds to a respective one of a plurality of Priority Flow Control (PFC) classes each defining a respective class of network traffic;
    subdividing at least one of the plurality of logical memory portions into a plurality of sub-portions, wherein each of the sub-portions corresponds to a different one of a plurality of virtual local area networks (VLANs);
    upon receiving a data packet specifying one of the PFC classes, store the data packet in a corresponding one of the plurality of logical memory portions of the buffer based on the specified PFC class;
    upon determining, based on a predefined congestion condition occurring for a first one of the plurality of logical memory portions of the buffer, to suspend network traffic belonging to a first PFC traffic class corresponding to the first logical memory portion and flowing through a virtual local area network (VLAN) of a plurality of VLANs, generating, by operation of one or more computer processors, a data frame comprising a specific VLAN ID that specifies the VLAN and a desired pause length, the data frame configured to instruct a computing device to at least temporarily stop transmitting data packets assigned to the VLAN and belonging to the first PFC traffic class for the desired pause length; and
    transmitting the data frame to the computing device in order to effect suspension of network traffic specific to the VLAN, while permitting network traffic belonging to the first PFC traffic class and specifying at least one other of the plurality of VLANs to continue to flow.

2. The method of claim 1, wherein the VLAN is configured based on at least one of: IEEE 802.1Q and a derivative of IEEE 802.1Q.

3. The method of claim 1, wherein the VLAN is a service VLAN (S-VLAN) and the VLAN ID is an S-VLAN ID.

4. The method of claim 3, wherein the data frame further comprises a customer VLAN ID that is associated with a customer VLAN that is assigned to the S-VLAN.

5. The method of claim 3, wherein the S-VLAN is configured based on at least one of: IEEE 802.1QinQ and a derivative of IEEE 802.1QinQ.

6. The method of claim 1, wherein the data frame further comprises a priority enable value that selects a traffic class as defined by IEEE 802.1 Qbb.

7. The method of claim 1, wherein the data frame further comprises a plurality of VLAN IDs that are each associated with a respective VLAN.

8. The method of claim 7, wherein the data frame further comprises a VLAN count value that represents a total number of the plurality of VLAN IDs in the data frame.

9. The method of claim 1, wherein the predefined congestion condition comprises head-of-line (HOL) blocking occurring in one of the plurality of sub-portions in the first one of the plurality of logical memory portions.

* * * * *